United States Patent [19]

Wrinkle

[11] 4,317,377
[45] Mar. 2, 1982

[54] DRAG ADJUSTMENT DEVICE FOR FISHING REELS

[76] Inventor: Donald R. Wrinkle, Raytown, Mo.

[21] Appl. No.: 190,954

[22] Filed: Sep. 26, 1980

[51] Int. Cl.³ .............................................. G01L 5/10
[52] U.S. Cl. ............................. 73/862.42; 73/862.53; 340/668
[58] Field of Search ........... 73/862.39, 862.53, 862.42, 73/828, 830; 340/668, 665, 666

[56] References Cited

U.S. PATENT DOCUMENTS

| | | |
|---|---|---|
| 2,003,910 | 6/1935 | Stephenson . |
| 2,544,128 | 3/1951 | Bell . |
| 2,722,763 | 11/1955 | Miner et al. ............... 340/668 X |
| 3,016,741 | 1/1962 | Kulp . |
| 3,044,052 | 7/1962 | Marsh . |
| 3,390,238 | 6/1968 | O'Neill .......................... 200/85 R |
| 3,848,463 | 11/1974 | Hejzlar et al. ................ 73/862.53 |
| 3,936,622 | 2/1976 | McElroy ........................ 200/85 R |
| 4,083,233 | 4/1978 | Seal . |

Primary Examiner—Charles A. Ruehl

Attorney, Agent, or Firm—Schmidt, Johnson, Hovey & Williams

[57] ABSTRACT

An improved, internally calibrated, accurate drag setting device for fishing reels is provided which allows the user to quickly and easily set reel drag and receive a visual or audible signal when this has been accomplished. The device includes a shiftable switch and an adjacent, reciprocal, spring-biased drag rod having a hook-receiving eye and a laterally projecting, switch-engaging foot thereon. A light is operatively coupled to the switch to indicate operation thereof, and an exterior setting knob is connected through a rack and pinion gear drive to the switch. In use, the switch is set by the knob a distance from the drag rod foot corresponding to the poundage rating of the line being used, and the reel line is secured to the rod eye; the drag rod is thereupon pulled upwardly through the line against the bias of the rod spring until the projecting foot thereof engages the spring to actuate the latter and illuminate the indicating light.

7 Claims, 6 Drawing Figures

U.S. Patent     Mar. 2, 1982     4,317,377
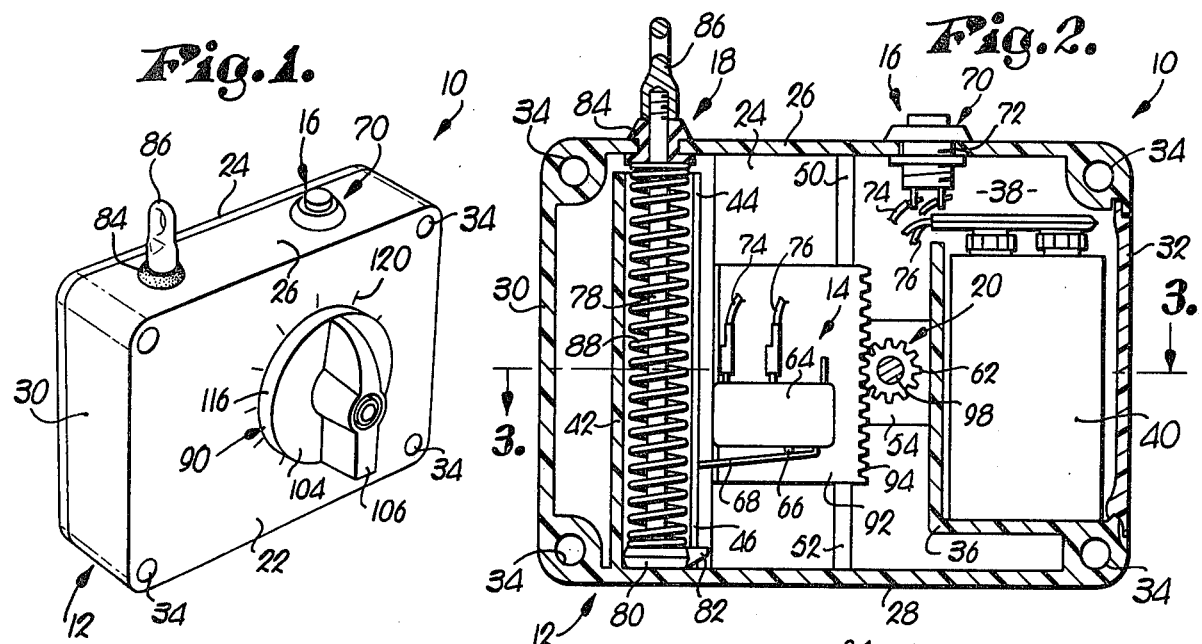
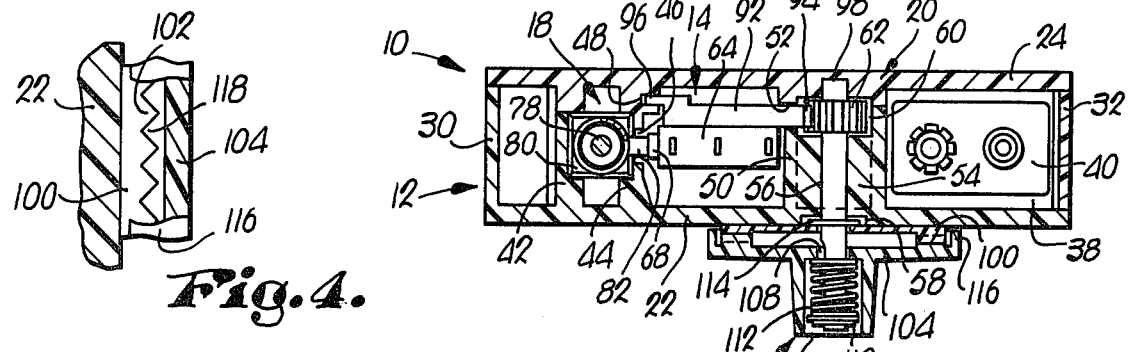
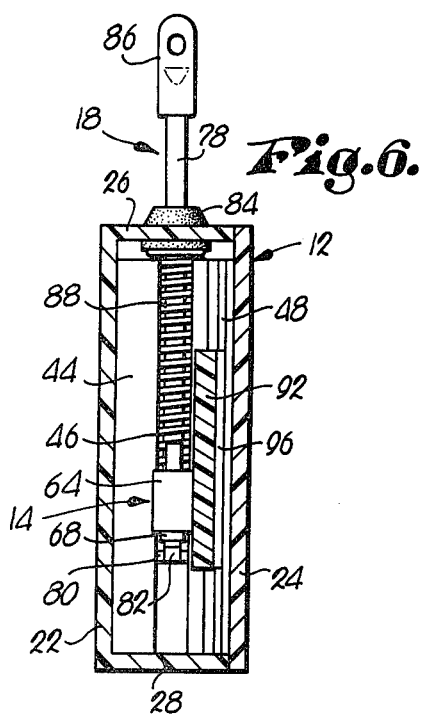
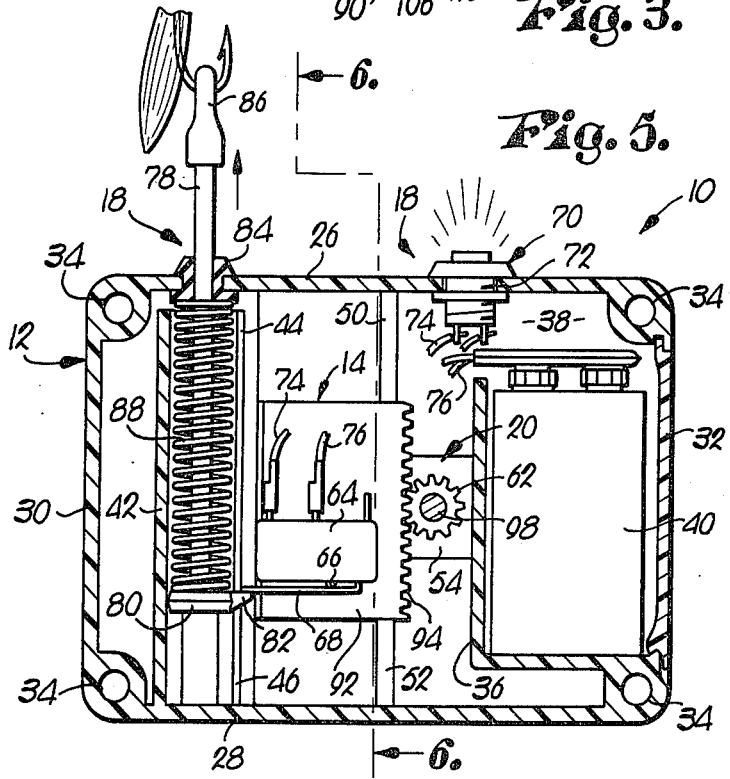

DRAG ADJUSTMENT DEVICE FOR FISHING REELS

BACKGROUND OF THE INVENTION

1. Field of the Invention

The present invention is concerned with a device for the setting of the drag adjustment on a fishing reel. More particularly, it is concerned with such a device which can be mounted either permanently or on a temporary basis on a boat, dock or any stable structure for ease for use, and which gives a perceptable indication when the proper drag setting is made.

2. Description of the Prior Art

As any experienced angler will attest, it is important that the drag adjustment on a fishing reel be properly set relative to the rated strength of the fishing line being employed. That is to say, in most cases it is recommended that the reel drag adjustment be set at a level of approximately one-third the total rated strength of the line; thus, when using a 12 pound test line, the drag should be set at a level of four pounds, although the final level can change depending upon fishing conditions (e.g., underwater brush) and the particular type of fish being sought. Drag adjustment settings either significantly higher or lower than the recommended figure can lead to line breakage when a fish strikes, or failure to properly hook the fish.

Drag adjustment devices have been proposed in the past, see U.S. Pat. Nos. 4,083,233 and 3,016,741. However, these devices are deemed deficient in a number of respects, including the difficulty of using the same and lack of accurate, reproducable results in drag setting. Also, these devices do not include any visual or audible indication when the drag adjustment is proper, and rely to a large extent on "feel."

In this connection, it will be realized that a drag setting device is of little value to a fisherman if its use is complicated or time consuming, and the results problematical from an accuracy standpoint. Accordingly, there is a real and heretofore unsatisfied need in the art for a reliable, accurate, easy to use drag setting device which gives a perceptible indication of proper drag adjustment.

SUMMARY OF THE INVENTION

The present invention in large measure solves the problems outlined above and provides a greatly improved drag adjustment device for a fishing reel and line. Broadly speaking, the device of the present invention includes a shiftable switch element operatively coupled to an indicator such as a light bulb or bell, along with a shiftable, spring biased drag element designed to be pulled by the reel line into engagement with the switch for operating the latter and activating the indicator. Preferably, the switch is shiftable through an external presetting knob to locate the switch in a desired spaced position relative to the switch-engaging portion of the drag element. A helical coil spring is disposed about the drag element for biasing the latter and creating a resistance force to movement thereof during drag setting operations.

The components of the device are preferably disposed within a compact housing which can be permanently affixed to a boat or dock for easy use by a fisherman. In addition, the housing includes a battery compartment for removably receiving a battery coupled to the switch and indicator light.

BRIEF DESCRIPTION OF THE DRAWING

FIG. 1 is a perspective view of a drag setting device in accordance with the invention;

FIG. 2 is a vertical sectional view of the device illustrated in FIG. 1 which depicts the internal construction of the device;

FIG. 3 is a sectional view taken along line 3—3 of FIG. 2;

FIG. 4 is an enlarged, fragmentary, sectional view illustrating the construction of the external setting knob associated with the drag adjustment device;

FIG. 5 is a vertical sectional view similar to that of FIG. 2, but illustrating the operation of the device; and FIG. 6 is a vertical sectional view taken along line 6—6 of FIG. 5.

DESCRIPTION OF THE PREFERRED EMBODIMENT

Turning now to the drawing, a drag adjustment device 10 in accordance with the invention is depicted. Generally speaking, the device 10 includes an outer casing 12, switch means 14, indicator means 16, a drag element 18, and means 20 for selective shifting of switch means 14 as will be described.

In more detail, rectangular casing 12 includes a front wall 22, rear wall 24, top wall 26, bottom wall 28 and one sidewall 30 integral with the walls 26, 28. The opposite sidewall 32 is removably received between the walls 26, 28 for purposes which will be made clear. In addition, it will be observed that four mounting holes 34 are provided at the corners of the casing 12; the holes 34 extend completely through the housing in order to permit permanent mounting thereof to a boat or dock through the use of appropriate fasteners.

Casing 12 further includes a somewhat L-shaped internal wall 36 which extends between front and back walls 22, 24, and defines, at the right-hand end of the casing structure as viewed in FIGS. 2 and 5, a battery-receiving compartment 38 which is sized to receive and hold a conventional 9-volt battery 40. It will be noted in this respect that the removable sidewall 32 is adjacent compartment 38 and permits access to the latter.

The casing structure 12 also includes a pair of spaced apart internal walls 42, 44 which extend between the front and rear walls 22, 24 and define an essentially square in cross-section, central, upright region therebetween. It should be noted in this respect that wall 44 includes a slot 46 which extends the length of the wall and is centrally located between the walls 22, 24. Moreover, an elongated, upright guide slot 48 is provided in wall 44 adjacent rear wall 24 (see FIG. 3). Another internal wall 50 is also provided and is disposed in spaced relationship from the wall 44. An elongated, upright slot 52 is provided through the wall 50 for purposes to be explained. Finally, the casing 12 includes an aperatured, gear-receiving block 54 which is located in the central region of the casing and extends between front and rear walls 22, 24, and between the internal wall 50 and the upright leg of L-shaped wall 36. The block 54 includes an elongated bore 56 therethrough which communicates with a similar bore 58 in front wall 22. In addition, the block is configured to present an opening 60 therein in communication with bore 58 for receiving a pinion gear 62.

Switch means 14 is of essentially conventional construction and includes a block 64 carrying a stationary contact 66 and a shiftable contact 68. It will be noted that the end of shiftable contact 68 extends generally laterally and leftwardly as viewed in FIGS. 2 and 5 to a point adjacent the slot 46 of upright internal wall 44.

The preferred indicator means 60 in accordance with the invention comprises a bulb assembly 70 which is mounted in an appropriate aperture 72 provided in top wall 26. Suitable wiring leads 74 and 76 are provided to operatively interconnect switch means, bulb assembly, and battery 40 so that the bulb is illuminated upon closing of the switch contacts 66, 68.

Drag element 18 is preferably in the form of an elongated rod 78 having a lowermost, substantially square pad 80 secured thereto, with a laterally extending, switch-engaging foot 82 extending from the pad 80 into and through the slot 46. As illustrated, the rod 78 is disposed within the square recess defined by the walls 42, 44, with the square pad 80 serving to guide the reciprocal travel of the rod and prevent axial rotation of the rod.

The uppermost end of rod 78 extends through an annular sealing ring 84 secured within an appropriate aperture in top wall 26. A hook-receiving eye 86 is threadably secured to the uppermost end of rod 78 and, in the rest position of the rod, engages sealing ring 84.

A helical spring 88 is disposed about rod 78 and engages the underside of ring 84 and the upper face of pad 80. While the strength of the spring 88 may vary to meet requirements of use, such as would be needed for drag setting of salt water fishing reels, it is believed that a 16-pound spring will be particularly advantageous for most fresh water fishing applications.

Switch shifting means 20 include an exterior, presetting knob 90 operatively coupled through a gear drive to the switch means 14 for selective vertical shifting of the latter. In detail, it will be seen that the block 64 is mounted on a rectangular, vertically shiftable rack plate 92 having vertically extending, peripheral gear teeth 94. The teeth 94 are in meshing engagement with the teeth of pinion gear 62 as can readily be appreciated. The side margin of plate 92 remote from the teeth 94 is provided with a lateral projection 96 which extends into the upright guide slot 48 provided in wall 44. In this manner, smooth up and down reciprocation of the plate 92, and thereby the switch means 14, is assured.

Pinion gear 62 is mounted for rotation on an elongated shaft 98 which extends through the bore 66 and is operatively connected to knob 90. Knob 90 includes an apertured, peripherally toothed, stationary member 100 which is secured to front wall 22 with the central aperture thereof in communication with bore 58. The stationary member 100 includes a series of teeth 102 about the circular periphery thereof. The knob further includes a rotatable member 104 having a central, outwardly extending gripper and pointer portion 106 which receives the outermost end of shaft 98. As best seen in FIG. 3, the shaft 98 extends through a central aperture 108 provided in the member 104, and into gripper portion 106 where it is fixedly secured as at 110. A spring 112 is disposed about the outermost end of shaft 98 within portion 106, and a ring 114 is affixed to shaft 98 at a point within bore 58 adjacent the inboard face of stationary member 100 (see FIG. 3). The periphery of shiftable member 104 is defined by a skirt 116 which extends to a point adjacent front wall 22. A series of circularly arranged teeth 118 are provided just inboard of the skirt 116, and the teeth 118 are designed to mesh with the teeth 102 of member 100 (see FIG. 4). Finally, a series of calibration markings 120 are provided on wall 22 which correspond to the poundage ratings of fishing lines.

The use of device 10 will now be explained. In this discussion it will be assumed for purposes of illustration that the device 10 is permanently affixed to a boat or dock, and that a fisherman, using a 12-pound test line, wishes to set his drag at the typical level of four pounds.

The first step is to grasp portion 106 of knob 90 and rotate the same in a clockwise direction until the gradation 120 corresponding to a 12-pound test line is reached. During such rotation, plate 92 and switch means 14 are shifted upwardly through the rack and pinion drive gears 62, 94. When the switch means is properly spaced above the foot, a force of approximately four pounds is required to elevate the foot for switch closing purposes. Such spacings are precalibrated for each line rating, depending upon the strength of the spring being employed.

Drag setting on the reel is initially set at a low level and the hook (see FIG. 5) attached to the fishing line is next inserted in eye 86. An upwardly directed force is next exerted through the line to lift the rod 78. During this operation, it is preferred that the fishing pole be maintained at about a 45 degree angle relative to the horizontal to approximate a normal fishing position, and the pulling force should approximate that used when hooking a fish. If such rod movement fails to illuminate the light, the drag setting is too low. Accordingly, the setting is adjusted upwardly and again tested until the device indicates that the setting is correct.

When the drag is properly set, the upwardly directed hooking force on rod 78 will cause foot 82 to engage contact 68 and close the latter against contact 66. This will illuminate the bulb of assembly 70.

Having thus described the invention, what is claimed as new and desired to be secured by Letters Patent is:

1. A drag adjustment device for a fishing reel equipped with a line, comprising:
switch means;
switch operating means;
indicator means operatively coupled to said switch means for giving a perceptible indication when said switch means operates;
a drag element including structure for connection of said line thereto;
means mounting said drag element adjacent said switch means for shifting movement of the element under the influence of a pulling force through said line connected thereto;
means for biasing said element against said shifting movement thereof;
means for mounting one of said switch means and switch operating means on said drag element; and
means for selectively shifting the other of said switch means and switch operating means to a desired position spaced from the one of said switch means and switch operating means mounted on said element.

2. The drag adjustment device as set forth in claim 1, said indicator means comprising an indicator light, a battery, and means operatively coupling said switch means, indicator light and battery for illumination of the light upon operation of said switch means.

3. The drag adjustment device as set forth in claim 1, said switch operating means being mounted on said drag element, said swith means being selectively shiftable.

4. The drag adjustment device as set forth in claim 3, said drag element comprising an elongated, reciprocable rod having a transversely extending, switch means-engaging foot on one end thereof and a fishing hook-receiving eye on the other end thereof.

5. The drag adjustment device as set forth in claim 3, said shifting means comprising a gear drive coupled to said switch means for said shifting thereof, and manually operable manipulative means operatively coupled to said gear drive for said shifting of said switch means through the gear drive.

6. The drag adjustment device as set forth in claim 1, said biasing means comprising a helical spring in operative engagement with said drag element.

7. The drag adjustment device as set forth in claim 1, including casing structure for said switch means, indicator means, and said drag element, said shifting means including manipulative means disposed exteriorly of said casing structure.

* * * * *